United States Patent Office 2,934,990
Patented May 3, 1960

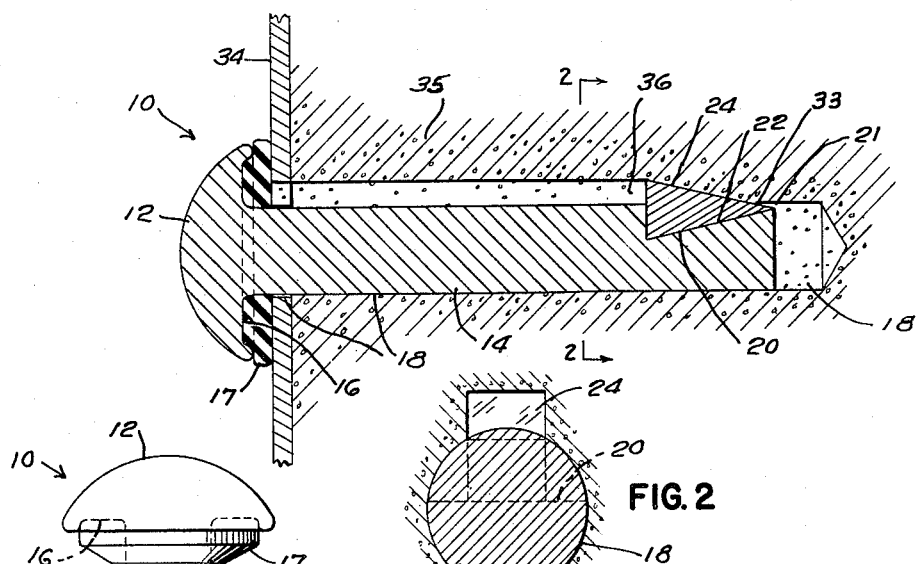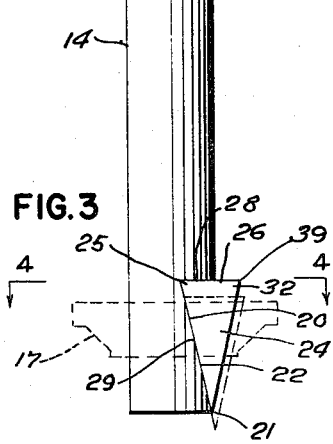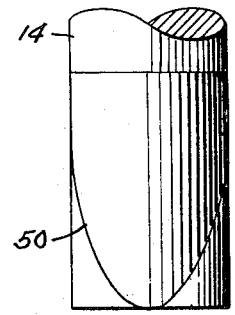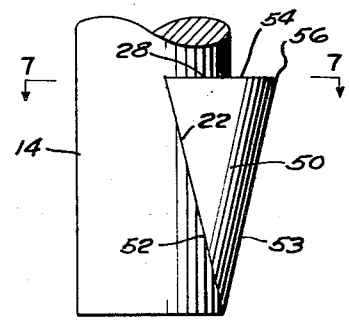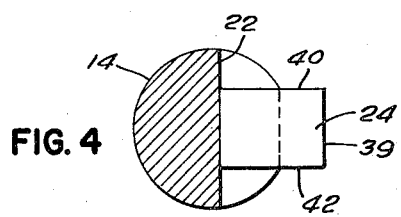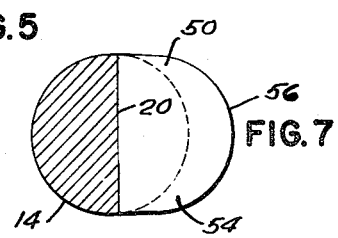
INVENTOR.
Thomas B. Johnson
Benjamin J. Holman
BY Robert L. Churchill
ATTORNEY

2,934,990

EXPANSIBLE DRIVE FASTENER

Thomas B. Johnson and Benjamin J. Holman, Ambridge, Pa., assignors to H. H. Robertson Company, Pittsburgh, Pa., a corporation of Pennsylvania Application December 13, 1956, Serial No. 628,065

4 Claims. (Cl. 85—23)

This invention relates to a fastening member and more particularly to an expansible drive fastener.

The invention has for an object to provide a novel and improved expansible drive fastener for use in securing structural members together, as for example in securing protected metal sheets of siding to the masonry framework of a building, which is characterized by novel and improved structure which enables the fastener to be driven into the members to be secured together and to resist attempts to dislodge it from its fixed secured position.

A further object of the invention is to provide a novel and improved fastener which is highly efficient in operation and which may be manufactured in an economical manner.

With these general objects in view and such others as may hereinafter appear, the invention consists in the novel and improved drive fastener and in the structure thereof hereinafter described and particularly defined in the claims at the end of this specification.

In the drawings illustrating the preferred embodiment of the invention:

Fig. 1 is a side elevation of the fastener in operative position securing a structural member to the concrete or masonry wall of a building;

Fig. 2 is a cross sectional view taken on the line 2—2 of Fig. 1;

Fig. 3 is a side elevation showing the fastener in its normal and expanded positions and illustrating means for retaining the wedge member in position prior to insertion of the fastener into the members to be secured together;

Fig. 4 is a cross sectional view taken on the line 4—4 of Fig. 3 illustrating the cutout portion in the end of the shank of the fastener;

Fig. 5 is a partial front elevation of a modified form of the invention showing a different form of wedge member;

Fig. 6 is a side elevation of the wedge member shown in Fig. 5; and

Fig. 7 is a cross sectional view taken on the line 7—7 of Fig. 6.

In general the present invention contemplates a novel and improved expansible drive fastener which is adapted to secure structural members to the concrete or masonry wall of a building and which may be inserted into securing position from one side only of the members to be secured together. The present fastener consists of a head portion and an elongated shank portion depending therefrom. The opposed end of the shank portion is provided with a cutout portion into which a wedge-shaped member may be detachably fitted. On wing portion of the wedge-shaped member extends laterally beyond the peripheral margin of the shank portion. Preformed holes may and preferably will be drilled in each of the structural members to be secured together, and a fastener having the wedge member in operative position is driven into the aligned predrilled holes in the structural members. The extended wing portion of the wedge member enables the fastener to resist attempts to dislodge it from its secured position by exerting an outward force against the wall of the hole into which the fastener is driven when an attempt is made to dislodge it, thus anchoring the fastener in the wall.

Referring now to the drawings illustrating the preferred embodiment of the present invention, 10 represents the expansible drive fastener having a head 12 and a shank 14. The head 12 is provided in its undersurface with an annular groove 16. A suitable washer 17 preferably of neoprene may be slipped on to the shank 14 and firmly compressed into the groove 16 as the fastener is tightened against one of the members being secured together. In this manner moisture is effectively prevented from seeping under the head 12 and through the preformed hole 18 in the structural members.

The shank 14 of the fastener may be provided with a cutout portion 20, as best shown in Figs. 3 and 4, extending from the end 21 thereof inwardly a short distance toward the head 12 of the fastener. The surface 22 of the cutout 20 is preferably tapered or sloped, as illustrated, inwardly toward the longitudinal axis of the shank.

In accordance with the present invention a wedge-shaped member 24, preferably composed of hardened carbon steel having a longitudinal cross-section of substantially generally isosceles triangular shape with a wide end 26 provided with wing portions 25, 32 and a pointed end 33, is adapted to be disposed within the cutout portion 20 as shown in Fig. 3. The wide end 26 of the wedge-shaped member 24 is positioned loosely within cutout portion 20 such that its top edge is placed in abutment with the shoulder 28 of the cutout portion 20. Wing portion 25 is disposed within cutout 20, the other wing portion 32 extending laterally beyond the marginal edge of the shank. The sloped edge 29 of the wedge is disposed upon tapered or sloped surface 22 of the cutout with the pointed end 33 thereof extending downwardly and terminating substantially flush with the end 21 of the shank member 14.

In the illustrated embodiment of the invention the present drive fastener is shown as utilized to secure a metal building sheet, such as wall panel 34 to the masonry or concrete wall 35 of a building in a simple and economical manner. Holes 18 may and preferably will be drilled in the wall panel and masonry, the holes being of a diameter substantially equal to the diameter of the shank 14 of the fastener. The wall panel 34 may then be positioned with relation to the masonry wall such that the holes may be aligned and the fastener driven thereinto as shown in Fig. 1. The wedge shaped member 24 is loosely supported within the cutout portion 20 prior to insertion of the fastener into the aligned holes 18 with the wide end thereof disposed under the shoulder 28. As shown in Figs. 1 and 3, in one embodiment of the invention the laterally extending wing portion 32 cuts a groove 36 resembling a keyway in the wall panel and masonry as the fastener is driven into securing position. The washer 17 positioned on the shank 14 is forced by engagement with the surface of the panel 34 into groove 16 under the head 12 of the fastener when the fastener is driven into the aligned holes to form a watertight seal between the head 12 and panel 34.

In operation when an attempt is made to dislodge the fastener from its secured position the wing portion 32 of the wedge member 24 is urged laterally outward by the cooperating sloped surfaces 22, 29 into engagement with the wall of the keyway cut into the concrete. As more pressure is applied to lift the head 12 of the fastener, the wedge 24 is caused to slide upon tapered surface 22 of the cutout 20 causing the sharp edge 39 of the wedge to be urged laterally with ever-increasing pressure against the wall of the groove 36 in the masonry as indicated in dotted lines in Fig. 3. In this manner the fastener is firmly secured in the masonry, thereby being capable of resisting attempts to dislodge it. In practice the resiliency of the compressed washer 17 tends to exert a constant force outward against the underside of the fastener head 12.

It is evident, from the foregoing, that with the parts in the position shown in Fig. 1, approximately one-half of the wedge shaped member 24 extends beyond the periphery of the shank 14, and that this projecting portion comprises, in effect, a pointed, laterally moving, anchoring means which is continuously moved outwardly into locking engagement with the masonry surrounding the wall of the hole in response to outward movement of the bolt, due to the cooperating sloped surfaces 22 and 29 of the cutout 20 and the wedge shaped member 24, respectively, which locking resists the outward movement of the bolt by (1) forcing the opposite peripheral wall of the shank into tighter frictional engagement with the wall of hole 18, and (2) producing a positive lock between the wedge member and shank. With reference to this last mentioned positive lock, it should be noted that the greater the outward movement of the bolt, the greater will be the extent of lateral movement of the angular or pointed end of the wedge member into the masonry material surrounding the hole, and that a larger leading surface of the base of the triangle shaped wedge member resists any outward movement of the wedge member. This resistance is transferred to the bolt by way of the interaction between the sloped surfaces 22 and 29. These sloping surfaces have two components: (1) a radial component which tends to drive the wedge member into tighter anchoring relation with the masonry material surrounding the hole, and (2) an axial component which resists outward movement of the bolt. Any outward movement of the bolt produces a deeper penetration of the wedge member into the masonry, and this action continues until either the wedge rides off the shank, or until the bolt fails.

In the embodiment of the invention shown in Figs. 1–4, the V-shaped wedge 24 is illustrated as a flat member having straight and parallel sides 40, 42 and the wedge may be of any suitable thickness relative to the width of the sloped cutout portion of the shank 14. Referring now to Figs. 5–7, in a modified form of the invention the cutout portion 20 in the end of the shank 14 may extend across the width of the shank in a manner similar to that shown in Fig. 4 to provide a sloped surface 22 and a shoulder 28. The wedge member 50 in the modified form comprises a diagonal section cut from the end of a cylindrical or elliptical rod so that in front elevation the wedge conforms substantially to the shape of a parabola, as shown in Fig. 5, with the upper end or wider portion conforming substantially to the width of the cutout portion, the lower or pointed end terminating substantially flush with the end of the shank member. In side elevation, as shown in Fig. 6, the wedge is substantially V-shaped having a flat sloped surface 52 for cooperation with the sloped surface 22 of the cutout, the opposing sloped surface 53 being rounded. A flat upper surface 54 cooperates with the shoulder 28 of the cutout. As shown in Fig. 7, the upper surface 54 of the modified wedge member 50 presents a relatively large area thereof extended beyond the marginal edge of the shank 14 and is semicylindrical or semi-elliptical in shape.

In use, the drive fastener shown in Fig. 5 may be driven into aligned preformed holes in the member 34 and masonry wall 35, the holes being of a size substantially equal to the diameter of the shank 14, the wedge 50 loosely engaged in the cutout under the shoulder 28 being forced to form a half-round groove as it is driven into its fully seated position with the washer 17 compressed under the head 12. As thus secured, the drive fastener is firmly anchored in the masonry wall, and any force exerted to pull the fastener out will cause lateral movement of the wedge by virtue of the cooperating sloped surfaces 22, 52 of the cutout 20 and wedge 50 respectively to urge the sharp rounded edge 56 into the masonry beyond the groove formed therein during the driving operation, thus preventing withdrawal of the fastener.

In order to retain the parts of the fastener together when not in use, the resilient washer 17 may be slipped over the end of the shank with the wedge member in position, as shown in dotted lines in Fig. 3. When the fastener is to be used, the washer is removed to release the wedge and is then replaced on the shank under the head 12. The wedge member may be held in position manually at the start of the driving operation, the wedge being self-retained during the remainder of the driving operation.

In practice the present fastener may be manufactured of stainless steel or other similar metal, and the wedge member may be stamped out of carbon steel and then hardened. It will be apparent that instead of a headed shank, as shown, the outer end of the shank may be threaded and provided with a nut and washer, not shown.

While it is preferred to provide a cutout portion and wedge member, as herein described, the shank member may be provided with a plurality of cutout portions and wedge members disposed on opposed sides of the shank member in alignment with each other or in staggered relation, and the cutout portion may be spaced upwardly from the end of the shank member.

From the foregoing description it will be apparent that the present expansible drive fastener may be economically manufactured and may be utilized to secure structural members together in a rapid and highly efficient manner capable of resisting all attempts to dislodge the fastener from its secured position.

Having thus described the invention, what is claimed is:

1. A drive fastener adapted to be secured in a masonry wall comprising a shank having a head portion and provided with a cutout portion at its lower end in one side thereof providing a sloped surface and a shouldered surface at substantially a right angle to the axis of the shank, said sloping wall extending inwardly from the outer periphery of the shank in a direction toward said head and terminating at its upper end at said shouldered surface, a rigid, non-resilient wedge piece having a corresponding sloped surface loosely fitted into cooperating engagement with said sloped shank surface and under said shouldered surface, said wedge piece having a radial longitudinal cross-section of substantially generally isosceles triangular shape, with a portion of its base confronting said shoulder and its apex disposed adjacent the outermost portion of said sloping wall, whereby approximately one-half of the wedge piece extends beyond the outer periphery of the shank when the base of the wedge piece abuts the shoulder, said drive fastener being adapted to be driven into preformed and aligned holes of about the same size as the shank in the parts to be fastened, the projecting portion forming a groove adjacent said holes as it is driven into fastening position, and a resilient washer arranged to be compressed between the underside of the head and the outer surface of the part being fastened when the fastener is driven into position providing a leakproof seal and exerting an outward force effecting slight lateral movement of the wedge piece by cooperation of said sloped surfaces to force the projecting portion beyond the depth of said groove to firmly anchor the shank and resist withdrawal of the fastener, said wedge piece also having an outer sloped surface extending angularly from the projecting portion to the small end of the wedge piece and in non-parallel relation to the plane of extension of the shank providing a relatively wide projecting portion which is continuously driven outwardly from said shank into locking engagement with the wall of the hole in response to outward movement of the fastener.

2. A drive fastener as defined in claim 1 wherein the cutout side portion is defined by a diagonal line extending from one edge of the shank at the lower end upwardly to a point approaching the longitudinal center line of the shank providing an upwardly and inwardly sloped surface, and by a line extending from the upper end of said sloped surface outwardly at right angles to the longitudinal center line to the outer edge of the shank providing said shouldered portion.

3. A drive fastener as defined in claim 2 wherein the wedge piece is substantially V-shaped with the projecting portion providing a sharp edge at its upper end for cooperation with the bottom of said groove, the lower end of the wedge piece terminating in a point substantially flush with the lower end of the shank, said sharp edge providing the sole engaging portion of the wedge piece with the groove, the remainder of the outer sloped surface being free of grooved engaging portions.

4. A drive fastener as defined in claim 3 wherein the wedge piece is substantially V-shaped and conforms substantially to the width of the shank at its upper end in plan elevation, one side of the V in side elevation having a flat sloped surface conforming in outline to the flat sloped surface of the shank, the opposite sloped surface being rounded with the projecting portion providing a relatively long sharp curved edge at its upper end for cooperation with the bottom of said groove, said sharp edge providing the sole engaging portion of the wedge piece with the groove, the remainder of the outer sloped surface being free of groove engaging portions.

References Cited in the file of this patent

UNITED STATES PATENTS

| | | |
|---|---|---|
| 300,057 | Earnest | June 10, 1884 |
| 956,378 | Lipscomb | Apr. 26, 1910 |
| 1,360,880 | Bucholtz | Nov. 30, 1920 |
| 2,133,871 | Reed | Oct. 18, 1938 |
| 2,231,068 | Harrington | Feb. 11, 1941 |
| 2,774,273 | Olson | Dec. 18, 1956 |

FOREIGN PATENTS

| | | |
|---|---|---|
| 175,127 | Great Britain | Feb. 16, 1922 |
| 673,953 | Great Britain | June 18, 1952 |